United States Patent [19]
Clatanoff et al.

[11] Patent Number: 5,609,969
[45] Date of Patent: Mar. 11, 1997

[54] STATIC DISSIPATIVE ELECTRONIC PACKAGING ARTICLE

[75] Inventors: William J. Clatanoff, Austin, Tex.;
Eric D. Morrison, Minneapolis, Minn.;
Nanayakkara L. D. Somasiri, Austin, Tex.

[73] Assignee: Minnesota Mining and Manufacturing Company, St. Paul, Minn.

[21] Appl. No.: 491,365

[22] Filed: Jun. 30, 1995

[51] Int. Cl.$^6$ ........................................................ B32B 9/00
[52] U.S. Cl. ................. 428/632; 428/209; 260/DIG. 17; 430/527; 430/530; 430/533; 430/529; 430/631
[58] Field of Search .................. 260/DIG. 17; 430/527, 430/530, 533, 529, 631; 428/632, 209

[56] References Cited

U.S. PATENT DOCUMENTS

| | | | |
|---|---|---|---|
| 3,734,874 | 5/1973 | Kibler et al. | 260/29.2 E |
| 3,779,993 | 12/1973 | Kibler et al. | 260/75 S |
| 4,052,368 | 10/1977 | Larson | 260/75 R |
| 4,203,769 | 5/1980 | Guestaux | 430/631 |
| 4,288,352 | 9/1981 | Weiss et al. | 260/23.5 A |
| 4,304,901 | 12/1981 | O'Neill et al. | 528/290 |
| 4,307,219 | 12/1981 | Larson | 528/71 |
| 4,330,588 | 5/1982 | Larson et al. | 428/264 |
| 4,634,865 | 1/1987 | Conway | 250/288 |
| 4,855,384 | 8/1989 | Larson | 528/60 |
| 5,006,451 | 4/1991 | Anderson et al. | 430/527 |
| 5,203,884 | 4/1993 | Buchanan et al. | 51/295 |
| 5,221,598 | 6/1993 | Anderson et al. | 430/527 |
| 5,284,714 | 2/1994 | Anderson et al. | 428/474.5 |
| 5,322,761 | 6/1994 | Kausch et al. | 430/273 |
| 5,356,468 | 10/1994 | Havens et al. | 106/195 |
| 5,360,706 | 11/1994 | Anderson et al. | 430/529 |
| 5,366,544 | 11/1994 | Jones et al. | 106/187 |
| 5,372,985 | 12/1994 | Chang et al. | 503/201 |
| 5,407,603 | 4/1995 | Morrison | 252/518 |

FOREIGN PATENT DOCUMENTS

| | | | |
|---|---|---|---|
| 2032405 | 5/1980 | United Kingdom | C01G 31/02 |
| WO93/24322 | 12/1993 | WIPO | B32B 27/18 |
| WO94/13723 | 6/1994 | WIPO | C08G 18/12 |

OTHER PUBLICATIONS

Unpublished Application, IP1374F514, filed with EPO as Application No. 94.1177388 on Nov. 10, 1994.
Ser. No. 07/893,279 Morrison Jun. 4, 1992.
Ser. No. 08/049,710 Cadalbert Apr. 20, 1993.
Ser. No. 08/109,640 Hansen Aug. 20, 1993.

*Primary Examiner*—Patrick Ryan
*Assistant Examiner*—Cathy K. Lee
*Attorney, Agent, or Firm*—Gary L. Griswold; Walter N. Kirn; Darla P. Neaveill

[57] ABSTRACT

The invention comprises a self supporting electronic packaging article comprising an insulative polymer overcoated with an antistatic/protective coating system comprising from about 8 mg/m$^2$ to about 70 mg/m$^2$ vanadium pentoxide, from about 36 mg/m$^2$ to about 270 mg/m$^2$ of a polymer latex having a hydrophilic functionality, and from about 210 mg/m$^2$ to about 842 mg/m$^2$ of a nonsulfonated protective topical binder, all of which may be contained in a single coating, or which may be contained in a two-layer coating system.

21 Claims, 3 Drawing Sheets

STATIC DISSIPATIVE ELECTRONIC PACKAGING ARTICLE

BACKGROUND OF THE INVENTION

1. Field of the Invention

The present invention relates to antistatic electronic packaging articles, such as integrated circuit trays, packaging, and the like, specifically to an electronic packaging article having antistatic and protective coating(s) comprising a vanadium pentoxide, a polymer latex having a hydrophilic functionality, and a nonsulfonated protective topical binder.

2. Description of the Art

The traditional means of protecting sensitive electronic components from electrostatic energy has been the use of either ionically conductive coatings, i.e., surfactants, or conductive particulate filled plastics. Electrically active plastic composites use highly conductive fillers, such as particles, fibers or flakes in an insulative polymeric base resin. Commonly employed electrically active fillers include carbon powder, carbon fiber, metal powders, fibers and flakes, and metallized particles, fibers and flakes. These are disclosed in multiple patents, e.g., U.S. Pat. Nos. 4,634,865, and 4,288,352.

However, while useful, conductive particles suffer from some drawbacks. They are very expensive to make and use, and the expense is heightened due to the fact that such particulates are present throughout the volume and not just on the surface where the electrostatic dissipation (ESD) is required. It can also be difficult to control the conductivity due to the percolation phenomenon of the conductive media in the insulative matrices. The sensitive balance between the conductive filler and the insulative resin is further complicated by injection molding processes which cause variations in polymer/fiber orientation, density, shear and cooling rates.

A cheaper traditional technique of providing antistatic protection for electronic components has been the use of ionically conductive antistatic coatings thereon. These coatings provide a thin electrolytic film on the articles' surface by drawing moisture from the air. Mobility of ions in the film conducts electricity. However, these coatings have the disadvantage of lack of permanency; i.e., they may wash off or wear off, and their ESD protective properties are highly humidity dependent. Further, such coatings can be a contamination problem for electronic components.

More recently, the use of colloidal vanadium oxide colloids as antistatic coatings has been disclosed for a variety of uses has been disclosed. U.S. Pat. No. 4,203,769, discloses preparation of an antistatic layer from an aqueous composition comprising vanadium oxide. The composition may also contain a binder to improve the mechanical properties of an antistatic layer, such as cellulose derivatives, polyvinyl alcohols, polyamides, styrene copolymers, maleic anhydride copolymers, copolymer latexes of alkylacrylate, vinylidene chloride and itaconic acid, for photographic film or paper. The layer comprises at least 80%, preferably 100% vanadium pentoxide, which is prepared and recovered as an aqueous solution. The antistatic layer preferably is overcoated with a protective layer containing a cellulose compound.

U.S. Pat. No. 5,221,598 discloses a base for a photographic element which comprises a support, a vanadium pentoxide antistatic layer and an overlying barrier layer of a heat-thickening polyacrylamide polymer having hydrophilic functionality, and the photographic element, along with optional adjuvants such as gelatin, hardening agents, wetting agents, matte particles and the like. The protective layer prevents the diffusion of vanadium pentoxide out of the antistatic layer. The Examples reveal that the samples had excellent antistatic properties, and adhesion to the gelatin layer after 30 seconds and 60 seconds in developing and fixing solutions.

U.S. Pat. Nos. 5,356,468, 5,006,451, and 5,366,544 disclose a photographic element containing a vanadium pentoxide antistatic layer, and various binders; e.g., a cellulose acetate binder, a cellulose nitrate designed to prevent precipitation of the vanadium pentoxide out of the film base during precipitation and fixing.

The above photographic coatings need not have low surface resistivity, a critical issue in integrated circuit IC) handling, but need only have low internal resistivity.

Low-melting water-dispersible sulfopolyesters are disclosed for use in coatings, useful for stain release, photographic sublayers, adhesives, and the like in U.S. Pat. Nos. 3,734,874, 3,779,993, 4,052,368, 4,304,901 and 4,330,588.

U.S. Pat. No. 4,203,769 discloses an vanadium pentoxide colloid coating useful in photographic sublayers, magnetic recording films, and a wrapping for radiographic materials where the vanadium pentoxide colloid is coated onto lead coated paper, followed by a coating of cellulose acetate.

WO 93/24322 discloses the use of a vanadium oxide coating in packaging materials.

U.S. Pat. No. 5,407,603 discloses a process for the preparation of vanadium pentoxide colloidal dispersions which contain high aspect ratio particles, and are aged after formation of the dispersion for up to 8 days. The dispersions are disclosed to yield coatings having more effective antistatic decay properties while using lesser concentrations of vanadium oxide, antistatic coatings are disclosed.

Two embodiments have now been discovered that provide both an antistatic coating and a protective coating which insures longevity of the antistatic properties. Both embodiments provide a long lasting static dissipative electronic packaging article inexpensively, in contrast to conventional coated articles which suffer from the need to renew the antistatic coatings. Both embodiments provide noncontaminating, electrically conductive environmentally independent permanent antistatic coatings.

In one embodiment, a two layer coating is provided; the first layer being an $V_2O_5$ antistatic coating comprising the vanadium pentoxide and a minor amount of a polymer latex having a hydrophilic functionality; the second layer being a nonsulfonated protective topical binder.

In the second embodiment, it has been discovered that the nonsulfonated protective topical binder may be added directly into a $V_2O_5$ antistatic coating which also comprises a polymer latex having a hydrophilic functionality. The inclusion of the nonsulfonated protective topical binder provides a single layer antistatic/protective coating which exhibits improved permanence and humidity independence over the use of a single vanadium pentoxide-containing antistatic layer not containing such a topical binder.

SUMMARY OF THE INVENTION

The invention comprises a self supporting electronic packaging article comprising an insulative polymer overcoated with a single antistatic/protective coating comprising:

a) from about 8 mg/m² to about 70 mg/m² vanadium pentoxide, b) from about 36 mg/m² to about 270 mg/m² of a polymer latex having a hydrophilic functionality selected from the group consisting of sulfopolymers and addition polymers, and c) from about 210 mg/m² to about 842 mg/m² of a nonsulfonated protective topical binder, wherein said antistatic coating has a ratio of sulfopolymer to vanadium pentoxide of from about 0.5 to about 5.

The invention also comprises an electronic packaging article formed from an insulative polymer overcoated with a multiple layer antistatic/protective coating system comprising an antistatic layer comprised of:

a) an antistatic coating comprising from about 8% by weight to about 60% by weight vanadium pentoxide, and b) from about 36 mg/m² to about 270 mg/m² of a polymer latex having a hydrophilic functionality, selected from the group consisting of sulfopolymers, and addition polymers, wherein said antistatic coating has a ratio of sulfopolymer to vanadium pentoxide of from about 0.5 to about 5, said antistatic coating being overcoated with a protective coating comprising from about 210 mg/m² to about 842 mg/m² of a nonsulfonated protective topical binder.

Articles of the invention may be formed by conventional processes into a variety of shapes, sizes and packaging types and used wherever long-lasting antistatic protection is desired. Useful articles include electronic handling and packaging articles such as integrated circuit (IC) manufacturing process and shipping, accessories, such as lids, binding straps and the like, shipping tubes and magazines, discrete carries, pocket tape and the like, antistatic cables for electronic devices, die-level transport media for IC wafer carriers, wafer boats, and die-level trays. The composition useful herein may also be made into a film which would be useful in such applications as antistatic bags.

As used herein, the following terms have these meanings.

1. The term "sulfopolymer" or "sulfonated polymer" means a polymer comprising at least one unit containing a salt of a —$SO_3H$ group, preferably alkali metal or ammonium salt.

2. The term "sulfopolyester" means a polyester compound comprising a polycondensation product of dicarboxylic acids and dihydroxy alcohols, and at least one unit containing a salt of a —$SO_3H$ group.

3. The term "dispersed sulfonated polymer" means a solution or dispersion of a polymer in water or aqueous-based liquids; particles can be dissolved or they can be dispersed in the liquid medium and can have a maximum dimension of 1 to 10 micrometers.

4. The term "addition polymer latex" means a dispersion of a polymer derived from addition polymerization of olefinic monomers such as vinyl, acrylate, methacrylate, and vinylidene compounds in water or aqueous based liquids. The dispersed particles have a maximum dimension of from about 1 to about 10 micrometers.

5. The term "colloidal vanadium oxide" means colloidal dispersion of single or mixed valence vanadium oxide, wherein the formal oxidation states of the vanadium ions are typically +4 and +5. In the art, such species are often referred to as $V_2O_5$. In the aged colloidal form (several hours at 80° C. or more or several days at room temperature), vanadium oxide consists of dispersed fibrillar particles of vanadium oxide which preferably have a thickness in the range of 0.02–0.08 micrometers and length up to about 4 micrometers.

6. The terms "sol", "colloidal dispersion", and "colloidal solution" are used interchangeably and unless otherwise stated mean a uniform suspension of finely divided particles in a continuous liquid medium.

7. The terms "thin-film" and "thin film coating" refer to a coating having a thickness of at least 10 Å to 1000 Å.

8. The term "film-forming polymer" means that the polymer particles in dispersion coalesce to provide a continuous, transparent, essentially non-porous polymer film when dried. A test for coalescence is to coat a thin film of the polymer onto a transparent substrate using a 11% polymer dispersion, drying and observing for clarity. A film-forming polymer will yield a transparent or nearly transparent film.

9. The term "nonsulfonated protective topical binder" means a thermoset-film forming polymer, containing no $SO_3H$ groups.

All parts, percents and ratios herein are by weight unless otherwise specifically stated.

DETAILED DESCRIPTION OF THE INVENTION

Figure 1:
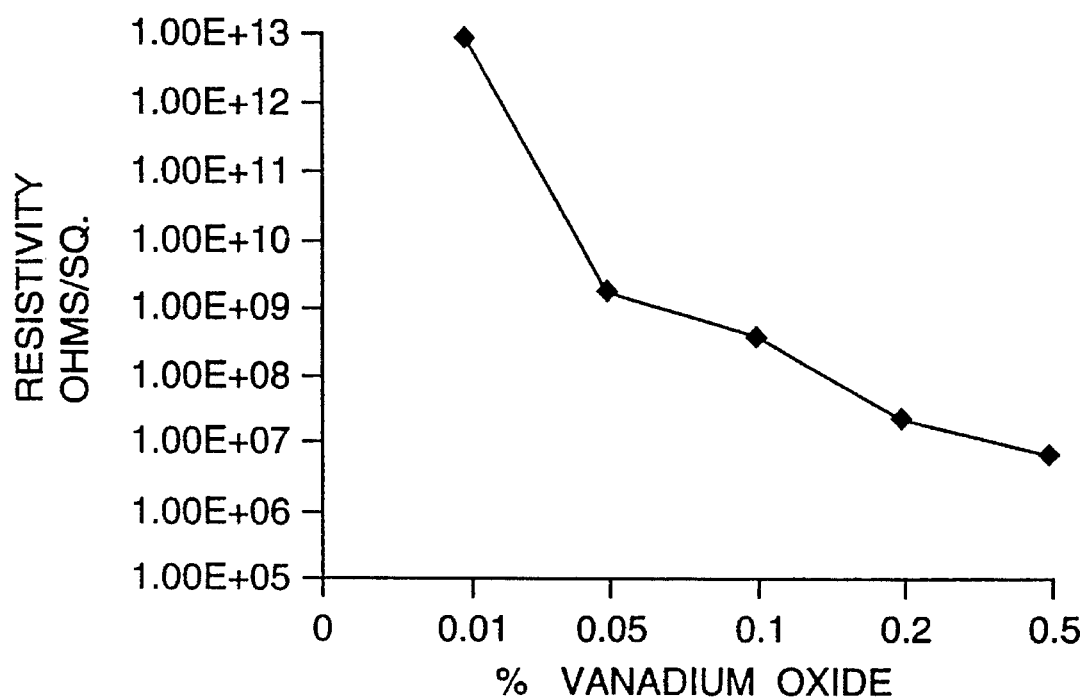
FIG. 1 is a graph which shows the relationship between variation of surface resistivity to percent vanadium oxide.

Electronic packaging articles of the invention are self-supporting articles useful as packaging for sensitive electronic parts such as integrated circuits, wafers, and the like.

Articles of the invention are formed from insulative polymers. Useful insulative polymeric resins include, but are not limited to, thermosets such as epoxies, and urethanes, and thermoplastics such as polyesters, polycarbonates, polysulfones, polyethers, such as polyether sulfone, polyolefins such as light, medium and high density polyethylene, ethylene-propylene copolymers, either random or block configuration, polypropylene, polypropylene-maleic acid anhydrides, polystyrene, styrene-acrylonitrile copolymers, acrylonitrile-butadiene-styrene copolymers, poly(methyl methacrylate)s, ethylene vinyl acetates, ethylene-acrylic acid copolymers, vinyl chloride-polypropylene copolymers, polyisobutylene, polybutadiene, and crosslinked polyethylene, whether chemically, thermally or E-beam crosslinked, and polyphenylene sulfide, polyetheretherketone, polyetherimide, polyarylsulfone and polypropylene oxide modified polyether sulfones.

The insulative polymer is then overcoated with, depending on the embodiment, a single antistatic/protective coating or a separate antistatic coating, overcoated with a protective coating.

The antistatic coating comprises a vanadium oxide dispersion. Useful vanadium oxide dispersions can be formed by any method which yields such a dispersion, including conventional methods such as acidification, condensation reactions, neutralization reactions, and hydrolysis of vanadium oxoalkoxides in an excess of water, as described by C. Sanchez et al, in *Mar. Res. Soc., Symp. Proc.*, 121, 93 (1988), incorporated herein by reference. Methods of preparation are preferred which yield relatively lengthy vanadium pentoxide fibers in the dispersion as such fibers provide better antistatic properties, thus requiring less total vanadium pentoxide. Two methods which yield such lengthy fiber dispersions are hydrolysis in an excess of water, and preparation and recovery as an aqueous solution by heating the compounds above the melting point and casting the molten mass into a solubilizing amount of water, as disclosed in U.S. Pat. No. 4,203,769.

The preferred preparation of vanadium pentoxide involves hydrolyzing vanadium oxoalkoxides with a molar excess of deionized water, or the vanadium oxoalkoxides may be prepared in situ from a vanadium oxide precursor species and an alcohol. The vanadium oxide precursor species is preferably a vanadium oxyhalide or vanadium oxyacetate. If the vanadium oxoalkoxide is prepared in situ, the vanadium oxoalkoxide may also include other ligands such as acetate groups.

The hydrolysis process results in condensation of the vanadium oxoalkoxides to vanadium oxide colloidal dispersions. It can be carried out in water within a temperature range in which the solvent, which preferably is deionized water or a mixture of deionized water and a water-miscible organic solvent, is in a liquid form, e.g., within a range of about 10° C. to about 100° C. The process is preferably and advantageously carried out within a temperature range of about 25° C. to about 30° C., i.e., at about room temperature.

In preferred embodiments, the deionized water or mixture of deionized water and water-miscible organic solvents contains an effective amount of a hydroperoxide, such as $H_2O_2$. The deionized water and hydroperoxide are then combined with a water-miscible organic solvent, such as a low molecular weight ketone or an alcohol.

The homogeneous solution resulting from the preferred hydrolysis is preferably subjected to an aging process to allow for initially formed vanadium oxide fibrils to coalesce. The aging process typically involves storing the solution in a constant temperature bath until a thixotropic colloidal dispersion is formed. Preferably the aging is conducted for a period of about 8 hours up to about 6 days in a 20° C. to 90° C. water bath, more preferably, 40° C. to 60° C. water bath. While improvement is noted with aging conditions of up to about 10 days, preferably aging is conducted only for from about 8 to about 24 hours. Aged dispersions provide better coatings, and coatings which provide optimum decay conditions at low coating weights.

Preferably, the vanadium oxoalkoxide is a trialkoxide of the formula $VO(OR)_3$, wherein each R is independently an aliphatic, aryl, heterocyclic, or arylalkyl group. Preferably, each R is independently selected from the group consisting of $C_{1-10}$ alkyls, $C_{1-10}$ alkenyls, $C_{1-10}$ alkynyls, $C_{1-18}$ aryls, $C_{1-8}$ arylalkyls, or mixtures thereof, which can be substituted or unsubstituted. "Group" means a chemical species that allows for substitution or which may be substituted by conventional substituents which do not interfere with the desired product. More preferably, each R is independently an unsubstituted $C_{1-6}$ alkyl. When it is said that each R is "independently" selected from a group, it is meant that not all R groups in the formula $VO(OR)_3$ are required to be the same.

The antistatic coating of the invention also comprises a polymer latex having a hydrophilic functionality. Such polymer latex is preferably present in amounts such that the ratio of polymer latex to vanadium pentoxide is from about 0.5:1 to about 5:1. Useful polymer latexes are preferably selected from certain sulfopolymers and addition polymers, most preferably sulfopolyesters.

A wide variety of sulfopolymers are useful, including sulfopolyols, sulfopolyesters, ethylenically unsaturated sulfopolymers, sulfopolyurethanes, sulfopolyureas, and the like.

Preferred sulfopolymers and sulfopolyesters have been disclosed in U.S. Pat. Nos. 4,052,368; 4,307,219; 4,330,588, and 4,855,384, all of which are incorporated herein by reference.

Sulfopolyesters are preferably low melting, i.e., below 100° C., or noncrystalline sulfopolyesters which may be water-soluble or may be dispersed in water with an emulsifying agent to produce a stable emulsion.

The sulfopolyesters preferred in this invention can be prepared by standard techniques, typically involving the reaction of dicarboxylic acids (or diesters, anhydrides, etc. thereof) with monoalkylene glycols and/or polyols in the presence of acid or metal catalysts (e.g., antimony trioxide, zinc acetate, p-toluene sulfonic acid, etc.), utilizing heat and pressure as desired. Normally, an excess of the glycol is supplied and removed by conventional techniques in the later stages of polymerization.

The addition polymer latexes suitable for use in the present invention can be prepared by emulsion polymerization reactions using conventional surfactants and known initiators. Useful surfactants are anionic or non-ionic. Useful initiators include persulfates alone or with bisulfites, which may in turn include metal ions such as ferrous ions, or "redox" sol polymerization initiator systems. If persulfates are used, the concentrations of persulfates in the vanadium pentoxide containing antistatic coating must be limited to 180 ppm or coagulum is formed. Preferred initiators are prepared using nonionic or anionic derivatives of azoisobisisobutyronitrile, available commercially as Vazo® initiators from Wake Chemical Company. Polymer dispersions formed using these initiators are much more compatible with colloidal vanadium oxide than are polymers prepared with other initiators; e.g., coating solutions made with such polymer dispersions and vanadium oxide have better stability, lack of coagulum or agglomeration, higher useful concentrations of polymer and the like. It is preferable that the concentration of polymer in the coating solution containing both vanadium oxide and polymer be greater than about 0.5% by weight, and that the coating solution exhibits stability for at least about two hours, preferably at least about 16 hours.

The addition polymer latexes preferably comprise polymers which are film forming at temperatures below the glass transition temperature of the insulative electronic packaging article to be coated.

A particularly suitable addition polymer is a terpolymer of the type taught in U.S. Pat. No. 2,627,088, incorporated herein by reference, comprising from about 35 to about 96% by weight vinylidene chloride, from about 3.5% to about 64.5% by weight of an ethylenically unsaturated ester, and from about 0.3 to about 25% by weight of a monomer selected from itaconic acid, the sulfopolymer ester of itaconic acid, acrylic acid and methacrylic acid.

Coating systems of the invention contain a nonsulfonated protective topical binder, placed either in the single layer or in a separate protective layer. Useful nonsulfonated topical binders provide good abrasion and environmental resistance. A useful class of topical binders is that of thermoset-film forming polymers. These are polymers, which form an irreversible "set" film when heated, and include such polymers as polyurethanes, epoxies, phenolics, polyesters, and the like.

The most preferred class of nonsulfonated topical binders is polyurethanes. These include commercially available series such as "Witcobond" series from Witco, epoxy crosslinked polyurethanes; Bayhydrol 121 and 123, available from Miles, aliphatic polycarbonate/polyurethane blends and silane terminated polyurethanes such as hydrolyzable and/or hydrolyzed silyl-terminated polyurethanes in aqueous dispersion, such as those disclosed in WO94/13723, incorporated herein by reference.

While water-based topical binders are preferred for manufacturing and environmental reasons, solvent-borne binders are also useful as topical binders in coatings of the invention. Such solvent-borne binders may be easily substituted in two layer systems, as solvent compatibility with the antistatic coating components is unnecessary. Solvent-borne topical binders may also be used in single layer antistatic/protective coatings; however, the solvent should be miscible with the antistatic coating so as not to cause precipitation, agglomeration or haze.

Other useful polyurethanes include those formed from prepolymers containing isocyanate groups and hydroxyl-containing materials such as polyols and drying oils, and those formed from reactions of polyisocyanates with linear polyesters or polyethers containing hydroxyl groups.

Preferred polyurethanes include aliphatic polycarbonate/polyurethane blends and epoxy crosslinked polyurethanes.

Antistatic coatings of the invention comprise from about 2 to about 60 mg/m$^2$ vanadium pentoxide. A coating solution for a single antistatic/protective coating contains from about 0.05% to about 0.5% vanadium pentoxide and from about 0.05% to about 2.5% of the nonsulfonated protective topical binder; in a multiple coating system, the solution contains from about 0.05% to about 0.5% vanadium pentoxide, and 0.05% to about 1% of the polymer latex having a hydrophilic functionality.

The antistatic and/or protective layer of the present invention may contain conventional adjuvants which do not detract from the antistatic properties, e.g., adhesion promoters, plasticizers, pigments, dyes and the like.

Thickness of the coatings ranges from about 0.05 μm to about 1.5 μm when a single coating is used, and when an antistatic and a protective coating are used, the individual layer thicknesses range from about 0.05 μm to about 0.05 μm for the antistatic layer, and from about 0.02 μm to about 1.0 μm for the protective layer. packaging article.

The coating(s) of the invention may be coated by conventional processes such as dip coating, ultrasonic coating, roll coating, brush coating, hopper coating, calendering, curtain coating, Mayer bar coating, spin coating, spray coating, and the like.

The antistatic coating composition may be diluted with water or a water miscible organic solvent prior to application to the article substrate. Additionally, a surfactant may be added to aid uniform wetting to the substrate.

When the antistatic coating includes a sulfopolymer, it may be prepared by dispersing the sulfopolymer in water, or water plus a cosolvent. Useful organic cosolvents include acetone, methyl ethyl ketone, methanol, ethanol, alcohols and ketones.

Electronic packaging articles of the invention may be formed by subjecting the coated polymeric resin to conventional processes including thermoforming, vacuum forming, diecutting, pressing, stamping, injection molding, blow molding and the like, depending on the polymeric resin used and the desired final article. The article may also be formed from the insulative polymeric resin substrate first, then the formed article is subjected to coating processes such as those stated above, e.g., dip coating, and the like.

Electronic packaging articles of the invention may be formed into a wide variety of packaging media and shapes, such as tubes, flat pack trays, static shielding packaging, multi-chip carriers, and other electronic transport media, or can be formed to provide bases or protective portions of electronic devices which tend to build up static charges, such as computer bases, and the like.

The Examples below are for purposes of illustration only, and are not to be construed as limiting the scope of the invention, which is that defined in the claims.

TEST METHODS

Surface Resistivity Test Method

ANSI/ASTM D257 are standard test methods for measurement of "DC Resistance or Conductance of Insulating Materials". These test methods cover direct current procedures for determining the DC insulation resistance, volume resistance, volume resistivity, surface resistance and surface resistivity of electrical insulating materials.

One aspect of resistivity measurement is predicting the ability of insulating type materials to dissipate a buildup of electrostatic charge.

ANSI/ASTM D257 describe several measurement techniques and electrode configurations for determining resistivity. Surface resistivity is the parameter commonly used to gauge ESD protective properties of materials with a conductive surface over an otherwise insulating material.

Testing with ETS Model 803A

Sample Preparation

Flat test specimens, 8.25 cm in diameter by 0.25 cm thick, were molded of fiberglass reinforced ABS (a terpolymer of acrylonitrile, butadiene and styrene), then the antistatic coating was applied and dried, specimens were then measured for surface resistivity.

The ETS Model 803A Surface/Volume Resistivity Probe, from Electro-Tech Systems, Inc., Glenside, Pa., is a circular measuring electrode that is based on the concentric ring electrode design specified in the ANSI/ASTM D257 standard. A Keithley Model 247 High Voltage Source was connected in serial to the test probe and a Keithley Model 485 Picoameter. Resistance can be calculated using Ohm's law, R=V/I.

Figure 5:
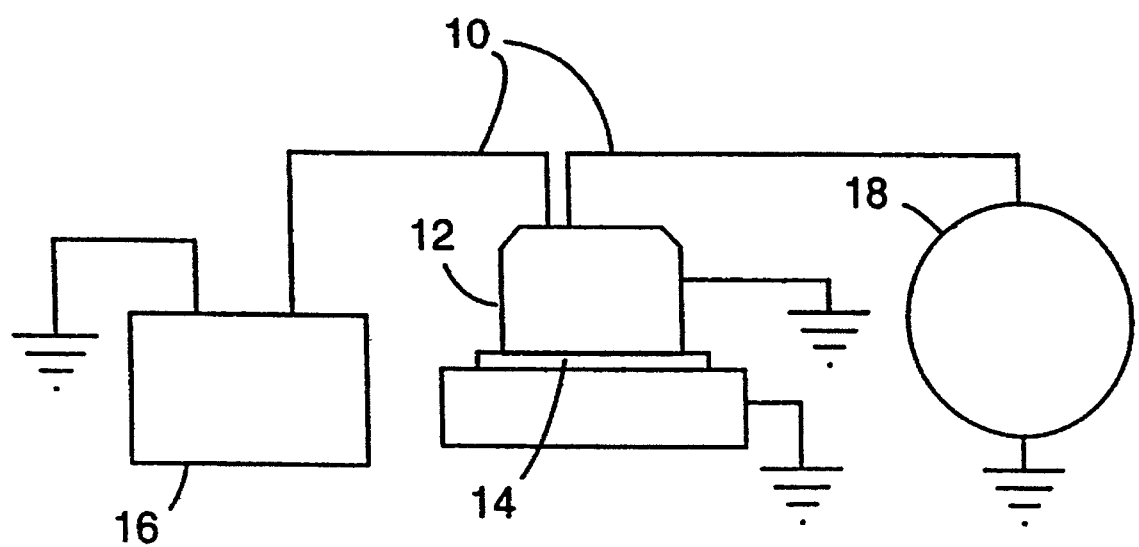

Set up equipment per FIG. 5 using shielded cable, 10 to connect the probe 12, the voltage source, 16 and the picoameter, 18. Turn on voltage source, 16, and picoameter, 18, and allow to stabilize for at least 20 minutes. Insure specimen is free from contamination and relatively flat. Place probe, 12 on specimen 14 as shown and insure contact is made with the electrodes and the specimen.

Apply a potential to the specimen, set voltage source to 500 volts, allow current to settle down for 15 seconds, then record the current. Calculate the surface resistivity by the following formula:

$$\rho_s(\Omega/\square) = k_{probe}(V_{source}/I)$$

where:

$\rho_s$=Surface Resistivity in Ohms per Square ($\Omega/\square$);

$k_{probe}$=Probe Geometry Factor=10 for EST Model 803A;
$V_{source}$=Voltage across the specimen in Volts;
I=Current across the specimen in Amperes.

Testing with Voyager Model SRM-110

Samples of IC handling trays, made of fiberglass reinforced ABS were used as articles for antistatic coatings. The molded trays were cut into 7.6 cm×7.6 cm samples, the antistatic coating was applied and blow dried for one to two minutes, and specimens were then measured for surface resistivity.

The Voyager Model SRM-110, from Pinion Corp., Southerton, Pa., is a hand held surface resistivity meter using a three point probe measuring technique. A voltage is applied to each of the 3 outer probe contacts while the center probe contact provides the ground. Meter readout is surface resistivity in ohms/square. The three point probe design enables the unit to be balanced on irregular and curved surfaces.

Voyager model SRM-110 meter was placed on the tray pieces so that the four electrodes were in contact with the tray surface. A stable meter reading was taken after 15 seconds. Three measurements were made by repositioning the meter and the average number was recorded.

Testing with Trek Model 150

Samples of IC handling trays, made of fiberglass reinforced ABS were used as articles for antistatic coatings. The ABS molded trays were cut into 7.6 cm×7.6 cm, then the antistatic coating was applied and blow dried, and specimens were then measured for surface resistivity.

The Trek Model 150, from Trek, Inc., Medina, N.Y., is a hand held surface resistivity meter based on the parallel bar electrode design described in the ANSI/ASTM D257 standard. A voltage is applied between the two electrode contacts, meter readout is surface resistivity in ohms/square. The test specimen must be relatively smooth and flat.

Trek model 150 meter was placed on the tray pieces so that both electrodes were in contact with the tray surface. A stable meter reading was taken after 15 seconds. Three measurements were made by repositioning the meter and the average number was recorded.

EXAMPLES

Preparation of Vanadium Oxide Dispersion

The vanadium oxide colloidal dispersion was prepared by adding 15.8 g, 0.555M, vanadium triisobutoxide (VO(O-iBu)$_3$), available from Akzo Chemicals, Inc, to a rapidly stirring solution containing 1.56 g of a 30% aqueous solution of hydrogen peroxide in deionized water at room temperature yielding a solution with vanadium concentration equal to 0.22 moles/kg (2.0% $V_2O_5$). Upon addition of the vanadium isobutoxide, the mixture became dark brown and gelled within 5 minutes. With continued stirring, the dark brown gel broke up, giving a nonhomogeneous, viscous dark brown solution, which became homogeneous after about 45 minutes. The sample was stirred for 1.5 hours at room temperature, and then transferred to a polyethylene bottle and aged in a constant temperature bat at 50° C. for 6 days, after which a dark brown thixotropic gel was formed. This gel was further mixed with deionized water to form desired concentrations before use in coating.

Preparation of Sulfopolyester Polymer Latex

A one gallon polyester kettle was charged with 126 g (6.2 mole %) dimethyl 5-sodiosulfoisophthalate, 625.5 g (46.2 mole %) dimethyl terephthalate, 628.3 g (47 mole %) dimethyl isophthalate, 854.4 g (200 mole %) glycol excess) ethylene glycol, 365.2 g (10 mole %), 22 weight % in final sulfopolyester) polycaprolactone diol, PCP-0200®, available from Union Carbide, 0.7 g antimony oxide, and 2.5 g sodium acetate. The mixture was heated with stirring to 180° C. at 138 kPa (20 psi) under nitrogen, and 0.7 g zinc acetate was added. Methanol evolution was observed. The temperature was increased to 220° C., and maintained for one hour. The pressure was then reduced, vacuum applied (0.2 torr), and the temperature increased to 260° C. The viscosity of the material increased over a period of 30 minutes, after which time a high molecular weight, clear viscous sulfopolyester was drained. The sulfopolyester was determined by DSC to have a $T_g$ of 41.9° C. The theoretical sulfonate equivalent weight was 3954 g polymer per mole of sulfonate.

500 g of polymer were dissolved in a mixture of 200 g water, and 450 g isopropanol at 80° C. The temperature was then raised to 95° C. remove the isopropanol, yielding a 21% solids aqueous dispersion.

Example 1

A one percent vanadium oxide colloidal solution was diluted with varying amounts of deionized (DI) water to prepare a series of coating solutions with different vanadium oxide concentrations. The sulfopolyester latex was prepared as described above. The solutions contained vanadium oxide, 1% sulfopolyester and 0.1% Triton® surfactant. Vanadium oxide content was varied from 0 to 0.5% by weight.

IC transport trays were solution coated by immersion for one minute, followed by blown air drying. The trays were then further dried in a convection oven at 90° C. for five minutes. Surface resistivity of coated trays was measured by using either the Trek Model 150 or the Voyager Model SRM-110 resistivity meters. The variation in surface resistivity with percent vanadium oxide is shown in FIG. 1.

As can be seen, the resistivity does not decrease significantly when the vanadium oxide concentration is increased above 0.2%.

Example 2

A series of coating solutions was prepared as described in Example 1, except that the series varied the ratio of sulfopolyester/vanadium oxide from 0 to 30.

Figure 2:
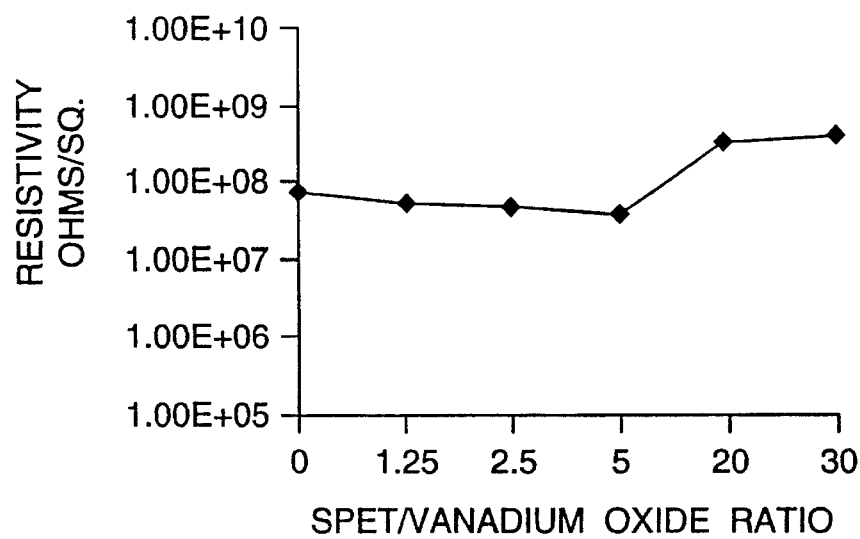
FIG. 2 shows the resistivity of single coating articles, and the variation thereof with the ratio of sulfopolyester/vanadium oxide.

IC transport trays were solution coated by immersion for one minute, followed by blown air drying. The trays were then further dried in a convection oven at 90° C. for five minutes. Surface resistivity of coated trays was measured by using either the Trek Model 150 or the Voyager Model SRM-110 resistivity meters. Surface resistivity was measured after coating in each solution, and the variation thereof with the ratio of sulfopolyester/vanadium oxide is shown in FIG. 2. These data show that resistivity increases significantly when the sulfopolyester:vanadium oxide ratio is greater than five.

Example 3

The composition of the coating solution was maintained at 0.2% vanadium oxide, 1% of the sulfopolyester latex described above, and 0.1% Triton® surfactant.

IC transport trays were solution coated by immersion for one minute, followed by blown air drying. The trays were then further dried in a convection oven at 90° C. for five minutes. Surface resistivity of the coated trays was measured by using either a Trek Model or a Pinion Model resistivity meter. The surface resistivity values of these trays varied between $10^7$ to $10^9$ ohms/sq. This is within the surface resistivity range preferred for IC trays.

Test plaques made in the same way showed surface resistivitiies of from $1.4 \times 10^8$ ohm/sq to $2.3 \times 10^8$ ohm/sq. by the ETS Model 803A Test Method.

Examples 4 and 4C

The coated trays were made as described in Example 3 above, and were aged at 40% RH and 10% RH at room temperature for six days. The resistivity of the trays were measured before and after aging. As seen in Table 1, resistivity of the vanadium oxide coated trays is not negatively impacted by humidity. In contrast, the resistivity of the trays coated with organic salt containing antistatic coatings (Staticide), available from ACI, Inc.) varied with humidity environment.

TABLE 1

|  | Ambient | 40% RH Six Days | 10% RH Six Days |
| --- | --- | --- | --- |
| Vanadium oxide* | $4.0 \times 10^7$ | $5.0 \times 10^7$ | $3.0 \times 10^7$ |
| Organic Salt | $6.0 \times 10^8$ | $2.0 \times 10^{11}$ | $3.0 \times 10^{11}$ |
| Carbon Blacktray | $2.0 \times 10^7$ | $2.0 \times 10^7$ | $8.0 \times 10^7$ |

*0.2% Vanadium Oxide
1% Sulfopolyester
0.1% Triton
98.7% DI Water

Example 5

The vanadium oxide coated IC trays of example 3 were subjected to a static decay test after six days exposure to a 10% RH environment. As seen in Table 2, these vanadium oxide coated trays showed very fast decay (less than a second) when the decay time from 5000 V to 0 V was measured.

TABLE 2

| Antistatic Agent | Ambient Resistivity | Resistivity 10% RH Six Days | Static Decay 5000 V to 0 V |
| --- | --- | --- | --- |
| 0.2% by Wt. Vanadium Oxide | $4.00 \times 10^7$ | $3.00 \times 10^7$ | 0.01 Seconds |
| 0.1% by Wt. Vanadium Oxide | $6.30 \times 10^8$ | $1.00 \times 10^9$ | 0.04 Seconds |
| Organic Salt | $6.00 \times 10^8$ | $2.00 \times 10^{11}$ | Infinity |

Vanadium Oxide Formulation
Vanadium Oxide
Sulfopolyester (1% by Wt.)
Triton Surfactant (0.1% by Wt.)
DI Water
*Resistivity in ohms/sq.

Examples 6C–7C, and 8–11

A series of coating solutions were prepared with 0.2% vanadium oxides and 0.1% Triton® surfactant. Varied polymer latexes were used in these solutions, with the percent of latex in each solution being 1%.

Figure 3:
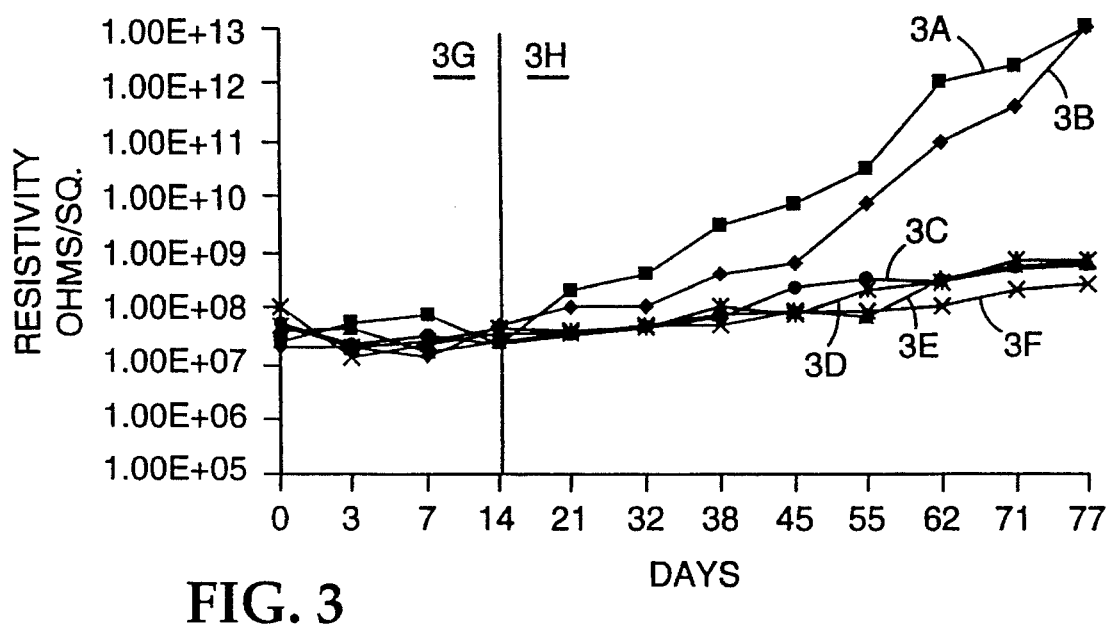
FIG. 3 shows the resistivity over time (up to 77 days) of articles having a single antistatic/protective coating using different polymer latexes.

The plot of resistivity variation with time for different topical binders is shown in FIG. 3.

The nonsulfonated protective topical binders evaluated in this study were thermoplastics, e.g., polyvinylidine chloride, (Example 6C, FIG. 3A); the sulfopolyester latex binder disclosed infra, (Example 7C, FIG. 3B); and thermosets such as waterborne polyurethanes. The polyurethanes evaluated in this study were silane terminated polyurethane, (Example 8, FIG. 3C); Witcobond 234, (Example 9, FIG. 3D), available from Witco; and Bayhydrol 121,(Example 10, FIG. 3F); and 123, (Example 11, FIG. 3E), available from Miles.

The trays were coated and dried as described in example 1 and subjected to two temperature/high humidity represented by 3G), and 85° C. and 85% RH, (above lines in the area represented by 3H). Resistivity was measured during the aging. At the lower temperatures and humidity, only small differences are seen. However, at the higher temperatures and humidity, large differences are seen between the various types of coating. These data indicate that polyurethane coated trays had the least change in resistivity of all of the coated trays when subjected to 85° C./85% RH; even better than a tray coated with a sulfopolyester latex.

Examples 12C, 13 and 14

In this Example, three different topical binders were coated onto trays with two layer coating systems.

Figure 4:
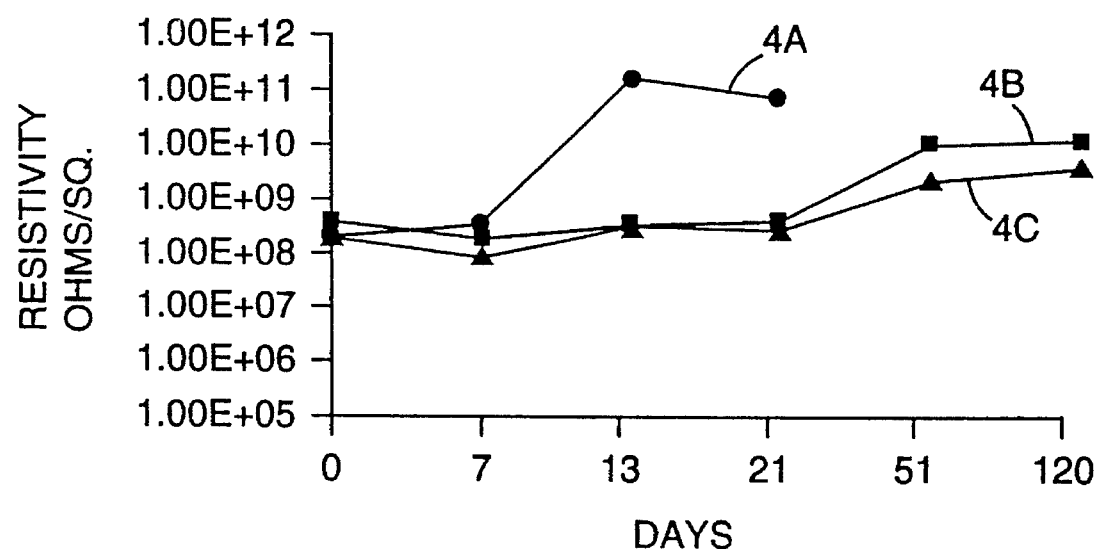
FIG. 4 shows the variation in resistivity over time for articles using two layer coating systems with differing nonsulfonated topical binders.

For the first layer of all three Examples, the trays were solution coated; the solution contained 0.2% vanadium oxide, 0.25% sulfopolyester and 0.1% Triton® surfactant as described in Example 1. After air drying, they were overcoated with a solution containing 0.5% binder, for one minute by immersion and blown dry with air. The resistivity variations of the trays with time is shown in FIG. 4. Example 12C was overcoated with a sulfopolyester latex binder disclosed infra, and shown as line 4A; Example 13 was coated with Witcobond® 234 polyurethane, and the line is shown as 4B. Example 14 was overcoated with a silane terminated polyurethane, and the line is shown as 4C. Coated trays were subjected to 85° C./85% RH aging, and the results show that the tray having an overcoating comprising a polyurethane binder had much less resistivity build up over time than the coating system having an overcoating of the sulfopolyester polymer latex.

Examples 15 and 16C

The tray described in Example 13 was aged in a 10% humidity environment for two days, and then subjected to a tribocharging measurement, as was an uncoated tray. A number of integrated circuits were neutralized by exposing to ionized air, and then mounted on the trays and vibrated for 5 minutes at 200 vibrations/minute. The charge accumulation was measured using a Faraday cup. The measured charge on all circuits mounted on the coated tray was below 0.04 nancoulombs. The charge accumulated on the uncoated tray was 0.30 nancoulombs; showing that the trays having a two layer system with an overcoating of the nonsulfonated protective topical binder showed much better antistatic properties than an uncoated tray.

During this experiment, the operator was wearing a Wrist Wrap (Minnesota Mining & Manufacturing Co.) to maintain at ground potential.

What is claimed is:

1. An antistatic electronic packaging article comprising an insulative polymer overcoated with a single layer antistatic/protective coating comprising:
   a) from about 8 mg/m$^2$ to about 70 mg/m$^2$ vanadium pentoxide,
   b) from about 36 mg/m$^2$ to about 270 mg/m$^2$ of a polymer latex having a hydrophilic functionality selected from the group consisting of sulfopolymers and addition polymers, and
   c) from about 210 mg/m$^2$ to about 842 mg/m$^2$ of a nonsulfonated protective topical binder, wherein said antistatic coating has a ratio of sulfopolymer to vanadium pentoxide of from about 0.5 to about 5.

2. An antistatic electronic packaging article according to claim 1 wherein said addition polymer is a terpolymer comprising from about 35% to about 96% by weight vinylidene chloride, from about 3.5% to about 64.5% by weight of an ethylenically unsaturated ester, and from about 0.5% to about 25% by weight of a monomer selected from itaconic acid, acrylic acid and methacrylic acid.

3. An antistatic electronic packaging article according to claim 1 wherein said sulfopolymer is selected from the group consisting of sulfopolyols, sulfopolyesters, and ethylenically unsaturated sulfopolymers.

4. An antistatic electronic packaging article according to claim 1 wherein said nonsulfonated protective topical binder is a polyurethane.

5. An antistatic electronic packaging article according to claim 4 wherein said polyurethane is selected from the group consisting of epoxy crosslinked polyurethanes; aliphatic polycarbonate/polyurethane blends and silane terminated polyurethanes.

6. An antistatic electronic packaging article comprising an insulative polymer overcoated with a multiple layer antistatic/protective coating system comprising:
   a) an antistatic coating comprising from about 8% by weight to about 60% by weight vanadium pentoxide, and
   b) from about 36 mg/m$^2$ to about 270 mg/m$^2$ of a polymer latex having a hydrophilic functionality, selected from the group consisting of sulfopolymers, and addition polymers, wherein said antistatic coating has a ratio of sulfopolymer to vanadium pentoxide of from about 0.5 to about 5, said antistatic coating being overcoated with a protective coating comprising from about 210 mg/m$^2$ to about 842 mg/m$^2$ of a nonsulfonated protective topical binder.

7. An antistatic electronic packaging article according to claim 6 wherein said addition polymer is a terpolymer comprising from about 35% to about 96% by weight vinylidene chloride, from about 3.5% to about 64.5% by weight of an ethylenically unsaturated ester, and from about 0.5% to about 25% by weight of a monomer selected from itaconic acid, acrylic acid and methacrylic acid.

8. An antistatic electronic packaging article according to claim 7 wherein said sulfopolymer is selected from the group consisting of sulfopolyols, sulfopolyesters, sulfopolyureas, and ethylenically unsaturated sulfopolymers.

9. An antistatic electronic packaging article according to claim 8 wherein said sulfopolymer is a sulfopolyester.

10. An antistatic electronic packaging article according to claim 6 wherein said nonsulfonated protective topical binder is a polyurethane.

11. An antistatic electronic packaging article according to claim 10 wherein said polyurethane is selected from the group consisting of epoxy crosslinked polyurethanes; aliphatic polycarbonate/polyurethane blends and silane terminated polyurethanes.

12. An antistatic electronic packaging article according to claim 1 wherein said article is selected from the group consisting of binding straps, shipping tubes, magazines, discrete carriers, pocket tapes, lids, antistatic cables for electronic devices, die-level transport media for IC wafer carriers, wafer boats, and die-level trays.

13. An antistatic electronic packaging article according to claim 6 wherein said article is selected from the group consisting of binding straps, shipping tubes, magazines, discrete carriers, pocket tape, lids, antistatic cables for electronic devices, die-level transport media for IC wafer carriers, wafer boats, and die-level trays.

14. An antistatic electronic packaging article according to claim 1 wherein said insulative resin was first coated with said antistatic/protective coating and then formed into said article.

15. An antistatic electronic packaging article according to claim 1 wherein said insulative resin was first formed into said article, said article then being coated with said antistatic/protective coating.

16. An antistatic electronic packaging article according to claim 6 wherein said insulative resin was first coated with said antistatic/protective coating and then formed into said article.

17. An antistatic electronic packaging article according to claim 6 wherein said insulative resin was first formed into said article, said article then being coated with said antistatic/protective coating.

18. A single self-supporting antistatic/protective film, said film being formed from
   a) from about 8 mg/m$^2$ to about 70 mg/m$^2$ vanadium pentoxide,
   b) from about 36 mg/m$^2$ to about 270 mg/m$^2$ of a polymer latex having a hydrophilic functionality selected from the group consisting of sulfopolymers and addition polymers, and
   c) from about 210 mg/m$^2$ to about 842 mg/m$^2$ of a protective comprising a nonsulfonated protective topical binder, wherein said antistatic coating has a ratio of sulfopolymer to vanadium pentoxide of from about 0.5 to about 5.

19. An antistatic electronic packaging bag formed from the film of claim 18.

20. A multiple layer self-supporting antistatic/protective film comprising:
   a) an antistatic layer comprising from about 8% by weight to about 60% by weight vanadium pentoxide, and
   b) from about 36 mg/m$^2$ to about 270 mg/m$^2$ of a polymer latex having a hydrophilic functionality, selected from the group consisting of sulfopolymers, and addition polymers, wherein said antistatic layer has a ratio of sulfopolymer to vanadium pentoxide of from about 0.5 to about 5, said antistatic coating being overcoated with a protective layer comprising from about 210 mg/m$^2$ to about 842 mg/m$^2$ of a nonsulfonated protective topical binder.

21. An antistatic electronic packaging bag formed from the film of claim 20.

* * * * *